(12) United States Patent
Sugimura et al.

(10) Patent No.: US 9,849,531 B2
(45) Date of Patent: Dec. 26, 2017

(54) ELECTRODE WIRE FOR WIRE ELECTRIC DISCHARGE MACHINING, AND METHOD FOR PRODUCING SAME

(71) Applicants: Sumitomo Electric Industries, Ltd., Osaka-shi (JP); Sumitomo (SEI) Steel Wire Corp., Itami-shi (JP)

(72) Inventors: Kazuaki Sugimura, Itami (JP); Hiromu Izumida, Itami (JP); Kenichi Shimizu, Itami (JP); Shinei Takamura, Itami (JP); Katsutoshi Iwamoto, Itami (JP)

(73) Assignees: Sumitomo Electric Industries, Ltd., Osaka-shi (JP); Sumitomo (SEI) Steel Wire Corp., Itami-shi (JP)

( * ) Notice: Subject to any disclaimer, the term of this patent is extended or adjusted under 35 U.S.C. 154(b) by 269 days.

(21) Appl. No.: 14/764,956

(22) PCT Filed: Sep. 2, 2014

(86) PCT No.: PCT/JP2014/072967
§ 371 (c)(1),
(2) Date: Jul. 30, 2015

(87) PCT Pub. No.: WO2015/033896
PCT Pub. Date: Mar. 12, 2015

(65) Prior Publication Data
US 2015/0360309 A1    Dec. 17, 2015

(30) Foreign Application Priority Data

Sep. 9, 2013    (JP) .................................. 2013-186150

(51) Int. Cl.
*B23H 7/24*    (2006.01)
*B23H 7/08*    (2006.01)
(Continued)

(52) U.S. Cl.
CPC ............... *B23H 7/24* (2013.01); *B21C 1/003* (2013.01); *B21C 1/02* (2013.01); *B23H 7/08* (2013.01);
(Continued)

(58) Field of Classification Search
CPC ..... B23H 7/08; B23H 7/24; Y10T 428/12431; Y10T 428/12514; Y10T 428/12792; Y10T 428/12799
See application file for complete search history.

(56) References Cited

U.S. PATENT DOCUMENTS 4,977,303 A * 12/1990 Briffod .................... B23H 7/08
148/240
4,988,552 A * 1/1991 Tomalin .................. B23H 7/08
219/69.12

(Continued)

FOREIGN PATENT DOCUMENTS

| CN | 1236337 A | 11/1999 |
|---|---|---|
| CN | 1762629 A | 4/2006 |

(Continued)

OTHER PUBLICATIONS

Machine translation of Japan Patent document No. 6-154,840, Jun. 2017.*

(Continued)

*Primary Examiner* — Geoffrey S Evans
(74) *Attorney, Agent, or Firm* — Venable LLP; Michael A. Sartori; Laura G. Remus (57) ABSTRACT

An object of the present invention is to improve machining speed by realizing both conductive properties and discharge performance with regard to an electrode wire for wire electric discharge machining, the electrode wire being obtained by plating a steel wire with a copper-zinc alloy. Another object is to suppress the occurrence of separation, (Continued)

cracking, and the like of plating in a wire-drawing step of an electrode wire. An electrode wire for wire electric discharge machining of the present invention includes a steel wire (11) serving as a core wire, and a plating layer (12) that covers the steel wire and that is composed of a copper-zinc alloy, in which an average zinc concentration of the plating layer is 60% to 75% by mass, a conductivity of the plating layer is 10% to 20% IACS, and a wire diameter is 30 to 200 μm.

3 Claims, 6 Drawing Sheets

(51) Int. Cl.
    *C23C 2/06*     (2006.01)
    *C23C 2/38*     (2006.01)
    *B21C 1/02*     (2006.01)
    *C22C 18/02*     (2006.01)
    *B21C 1/00*     (2006.01)

(52) U.S. Cl.
    CPC ............... *C22C 18/02* (2013.01); *C23C 2/06* (2013.01); *C23C 2/38* (2013.01)

(56) References Cited

U.S. PATENT DOCUMENTS

| | | |
|---|---|---|
| 5,945,010 A | 8/1999 | Tomalin |
| 2009/0025959 A1* | 1/2009 | Tomalin ................. B23H 7/08 174/126.2 |

FOREIGN PATENT DOCUMENTS

| | | | |
|---|---|---|---|
| CN | 102369077 A | | 3/2012 |
| EP | 0526361 A1 | | 2/1993 |
| JP | 60-99526 | | 6/1985 |
| JP | 61-136734 | | 6/1986 |
| JP | 2-49849 B2 | | 11/1986 |
| JP | 5-192821 A | | 8/1993 |
| JP | 06-154840 A | * | 6/1994 |
| JP | 2002-126949 A | | 5/2002 |
| JP | 2003-073735 A | * | 3/2003 |
| WO | WO-2005/097387 A1 | * | 10/2005 |

OTHER PUBLICATIONS

Machine translation of Japan Patent document No. 2003-073,735, Jun. 2017.*
Notice of Preliminary Rejection in counterpart Korean Patent Application No. 2015-7020864, dated Sep. 13, 2016.
International Search Report in International Application No. PCT/JP2014/072967 dated Dec. 9, 2014.
Notification of the First Office Action in Chinese Patent Application No. 201480007920.4, dated Jun. 3, 2016.
"Copper Wire Tables," U.S. Department of Commerce, Circular of the Bureau of Standards, No. 31, 3rd Ed., Oct. 1, 1914.

* cited by examiner

ELECTRODE WIRE FOR WIRE ELECTRIC DISCHARGE MACHINING, AND METHOD FOR PRODUCING SAME

TECHNICAL FIELD

The present invention relates to an electrode wire for wire electric discharge machining and a method for producing the electrode wire.

BACKGROUND ART

A wire electric discharge machining method is a known method for cutting a workpiece (product to be machined). In the wire electric discharge machining method, in a state where an electrode wire for electric discharge machining formed of a wire pierces a workpiece immersed in a machining fluid, a voltage is applied between the electrode wire and the workpiece to generate electric discharge, the workpiece is melted by using heat generated by the electric discharge, and a melted portion of the workpiece is removed by vaporization and explosion of the machining fluid. The workpiece is moved in left and right directions and in forward and backward directions to continuously cause the melting and the removing phenomena along the trajectory of the electrode wire on the workpiece, thereby achieving cutting so as to have a desired shape.

The smaller the wire diameter of an electrode wire for electric discharge machining, the higher the precision of the machining that can be realized. Therefore, in general, a reduction in the diameter of the electrode wire has been desired. On the other hand, tension is provided to the electrode wire so that the electrode wire is not bent during electric discharge machining. When the diameter of an electrode wire is decreased, the electrode wire cannot withstand the tension and becomes easily broken. Therefore, it is also necessary to ensure a certain degree of tensile strength of the electrode wire.

Accordingly, as described in PTL 1, an electrode wire for wire electric discharge machining has been developed in which a surface of a steel wire serving as a core wire of an electrode wire is plated with a copper-zinc alloy (brass). Such an electrode wire includes a core wire formed of a steel wire and thus is excellent in terms of tensile strength compared with a brass wire and the like. Furthermore, a conductive property is ensured by copper in the brass plating, and discharge performance is ensured by zinc in the brass plating.

CITATION LIST

Patent Literature

PTL 1: Japanese Examined Patent Application Publication No. 2-49849

SUMMARY OF INVENTION

Technical Problem

Regarding an electrode wire formed of such an existing brass-plated steel wire described in PTL 1, the concentration of zinc in brass is relatively low, specifically, 10% to 50% by mass. Accordingly, although the conductive property is good, the discharge performance is insufficient. In the wire electric discharge machining method, as described above, machining is performed by melting a workpiece with heat generated by electric discharge from an electrode wire. Accordingly, there may be a problem in that when the discharge performance (electron emission performance) is insufficient, the machining speed does not increase.

On the other hand, when the concentration of zinc in brass becomes excessive, the copper component becomes inevitably insufficient and the conductive property decreases. As a result, the machining speed decreases.

Accordingly, an object to be achieve by the present invention is to improve machining speed by realizing both conductive properties and discharge performance with regard to an electrode wire for wire electric discharge machining, the electrode wire being obtained by plating a steel wire with a copper-zinc alloy. Another object of the present invention is to suppress the occurrence of separation, cracking, and the like of plating in a wire-drawing step of an electrode wire.

Solution to Problem

In order to achieve the above objects, an electrode wire for wire electric discharge machining of the present invention includes a steel wire serving as a core wire and a plating layer that covers the steel wire and that is composed of a copper-zinc alloy, in which an average zinc concentration of the plating layer is 60% to 75% by mass, a conductivity of the plating layer is 10% to 20% international annealed copper standard (IACS), and a wire diameter of a total of the plating layer and the core wire is 30 to 200 μm.

The "IACS" here refers to the International Annealed Copper Standard, an empirically derived standard value for the electrical conductivity of commercially available copper established in 1914 by the United States Department of Commerce. The standard is usually written as "0.15328 ohm (meter, gram) at 20° C." The standard is most often used as a comparative property in the specification of the conductivity of metals. For example, "1.2% IACS" means an electrical conductivity that is 1.2% of the copper specified as the IACS standard.

Advantageous Effects of Invention

By adjusting the zinc concentration in copper-zinc alloy plating of an electrode wire to the above range, the work function of the whole alloy is decreased, and conductivity and discharge performance are combined to improve machining speed.

DESCRIPTION OF EMBODIMENTS

Figure 1A:
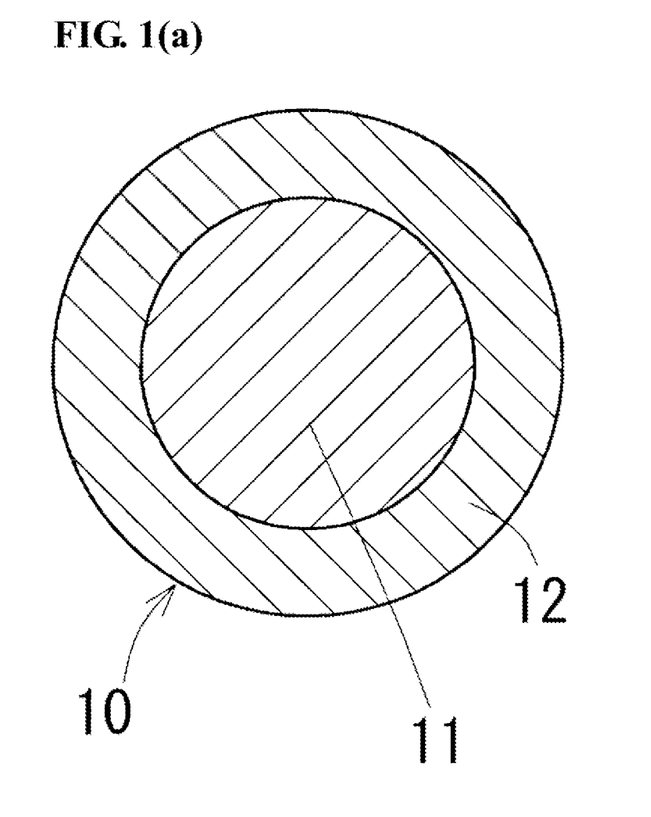
FIG. 1(a) is a cross-sectional view of an electrode wire for wire electric discharge machining.

Embodiments of the present invention will now be described. As shown in FIG. 1(a), an electrode wire 10 for wire electric discharge machining according to an embodiment includes a steel wire 11 serving as a core wire and a copper-zinc alloy plating layer 12 formed on the surface of the steel wire 11.

Herein, since the electrode wire 10 has a very small wire diameter of 30 to 200 µm, precise electric discharge machining can be performed. A tensile strength of the electrode wire 10 is not particularly limited, but is preferably 2,000 MPa or more so that the electrode wire 10 is not broken during electric discharge machining. A reduction of area of the electrode wire 10 in a wire-drawing process is not particularly limited, but is preferably 95% or more in order to realize such a high tensile strength as a result of work hardening.

The type of the steel wire 11 serving as a core wire is not particularly limited. However, in order to ensure a high tensile strength, a steel wire containing 0.6% to 1.1% by mass of carbon is preferable. Examples of such a steel wire include piano wires of so-called 60-carbon, 80-carbon, or 100-carbon.

An average concentration of zinc in the copper-zinc alloy plating layer 12 is 60% to 75% by mass, and the balance is copper and a trace amount of inevitable impurities. A conductivity of the copper-zinc alloy is 10% to 20% IACS, and particularly preferably 15% IACS. When the concentration of zinc is less than 60% by mass, the amount of zinc is insufficient and discharge performance becomes poor. When the concentration of zinc exceeds 75% by mass, the amount of copper is insufficient and a conductive property becomes poor.

By adjusting the average concentration of zinc in the copper-zinc alloy to 60% to 75% by mass and adjusting the conductivity to 10% to 20% IACS, an electrode wire 10 having an excellent balance between discharge performance and conductive properties and having good machining speed is obtained, as described in Examples below.

The thickness of the copper-zinc alloy plating layer 12 is not particularly limited. However, when the thickness of the copper-zinc alloy plating layer 12 is less than 3 µm, the thickness of the plating layer 12 is excessively small, and the conductive property, etc. of the whole electrode wire 10 may decrease. When the thickness of the copper-zinc alloy plating layer 12 exceeds 8 µm, the strength of the whole electrode wire 10 may decrease. Accordingly, thickness of the copper-zinc alloy plating layer 12 is preferably 3 to 8 µm. A covering ratio of the copper-zinc alloy plating layer 12 to the steel wire 11 is 15% to 45%. Specifically, the electrode wire 10 is in a state where separation and cracking are not substantially generated in the plating layer 12.

Figure 2A:
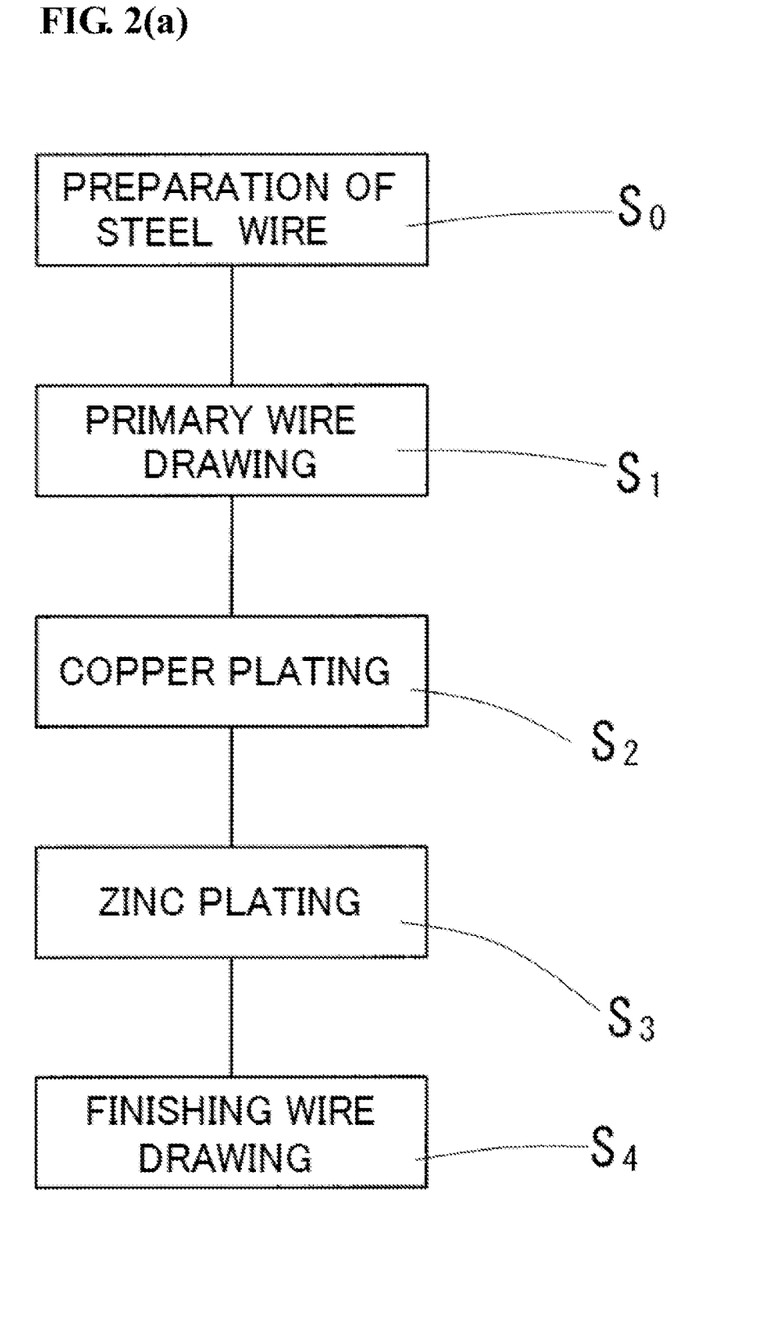
FIG. 2(a) is a flowchart showing an outline of steps of producing an electrode wire for wire electric discharge machining.

The electrode wire 10 of the embodiment is produced by a production method of an embodiment, as shown in FIG. 2(a). It should be noted that a minimum number of steps is shown here, and other steps may be added.

First, in step $S_0$, a wire rod (steel wire 11) having a wire diameter of, for example, 4.0 to 6.0 mm is prepared. This wire rod is subjected to pickling or the like in advance to remove scale, as required. Next, in step $S_1$, the wire rod is subjected to primary wire drawing by using, for example, a dry wire-drawing machine so as to have a wire diameter of, for example, 0.4 to 1.5 mm. A patenting treatment may be performed, as required, by heating and rapidly cooling the wire rod that has been subjected to the wire drawing.

Figure 1B:
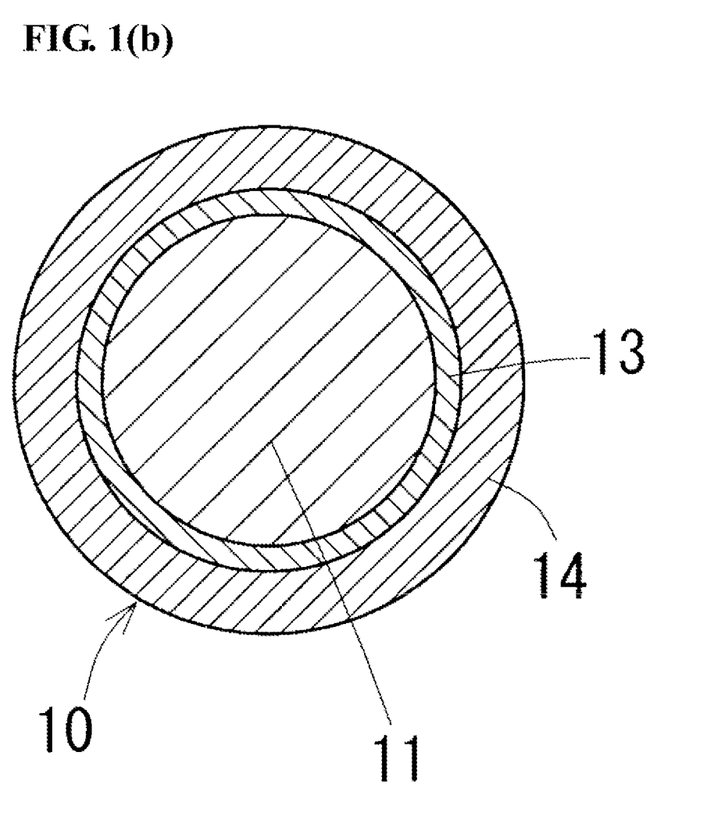
FIG. 1(b) is a cross-sectional view of an electrode wire for wire electric discharge machining before a diffusion treatment.

In step $S_2$, a plating process is performed on the wire rod to form a copper plating layer 13 on the surface of the wire rod. Subsequently, in step $S_3$, a plating process is further performed on the wire rod that has been subjected to the copper plating to form a zinc plating layer 14 on the surface of the wire rod. As a result, as shown in FIG. 1(b), the copper plating layer 13 is formed as an inner layer of the surface of the steel wire 11 and the zinc plating layer 14 is formed as an outer layer of the surface of the steel wire 11. The order of performing copper plating and zinc plating is not particularly important. Reversely, zinc plating may be first performed, and copper plating may then be performed. By performing the plating processes in a state where the wire rod before final wire drawing has a relatively large diameter, plating defects and the like can be prevented. The methods of these plating processes are not particularly limited, and common methods may be employed. Specific examples thereof include electroplating and molten-salt plating. Furthermore, a case where a coating film is formed by a conform method, which is an extrusion method, is also covered by a plating process used herein. The thicknesses of the copper plating layer 13 and the zinc plating layer 14 are not particularly limited. However, a weight ratio of the zinc plating layer 14 to the copper plating layer 13 is determined so as to satisfy 1.5≤Zn/Cu≤3.

Furthermore, in step $S_4$, the wire rod having the thick plating layer 14 thereon is subjected to finishing wire drawing (secondary wire drawing) by using, for example, a wet wire-drawing machine so as to have a wire diameter of 30 to 200 µm. In this method, a total reduction of area of the wire rod in the wire-drawing steps of step $S_1$ and step $S_4$ is not particularly limited, but is preferably 95% or more in order to improve a tensile strength.

The copper plating layer 13 and the zinc plating layer 14 are alloyed by a diffusion treatment to form a copper-zinc alloy plating layer 12. Thus, an electrode wire 10 for wire electric discharge machining of the embodiment is produced.

Since the weight ratio of the zinc plating layer 14 to the copper plating layer 13 is 1.5≤Zn/Cu≤3 as described above, the average concentration of zinc in the copper-zinc alloy plating layer 12 becomes 60% to 75% by mass. In this case, the conductivity is within the range of 10% to 20% IACS in accordance with the plating thicknesses and the type of alloy. The copper-zinc alloy plating layer 12 may be formed so as to have a concentration gradient in a thickness direction thereof. Alternatively, the copper-zinc alloy plating layer 12 may be formed so as to be substantially homogeneous without having a concentration gradient. However, zinc, which contributes to the discharge performance, appears on the surface of the electrode wire 10 prior to the diffusion treatment, and thus, the treatment can be finished in a state where the concentration gradient is relatively large. In this case, degradation of the steel wire 11 due to heat or the like can be prevented.

A copper-zinc alloy having a zing concentration of 60% to 75% by mass is in a state of a γ-phase, and has a hexagonal structure. Accordingly, such a copper-zinc alloy is hard and brittle, and it is difficult for the copper-zinc alloy to be subjected to plastic working. Therefore, in the case where wire-drawing conditions (selection of a reduction of area and a die half angle) are not appropriate during finishing wire drawing, separation and cracking of the plating layer 12 may occur during the finishing wire drawing. Such separation and cracking of the plating layer can be prevented by controlling the conditions for finishing wire drawing in accordance with a certain index (wire-drawing condition index in Tables II and III), as shown in Tables II and III of Examples below.

Figure 1C:
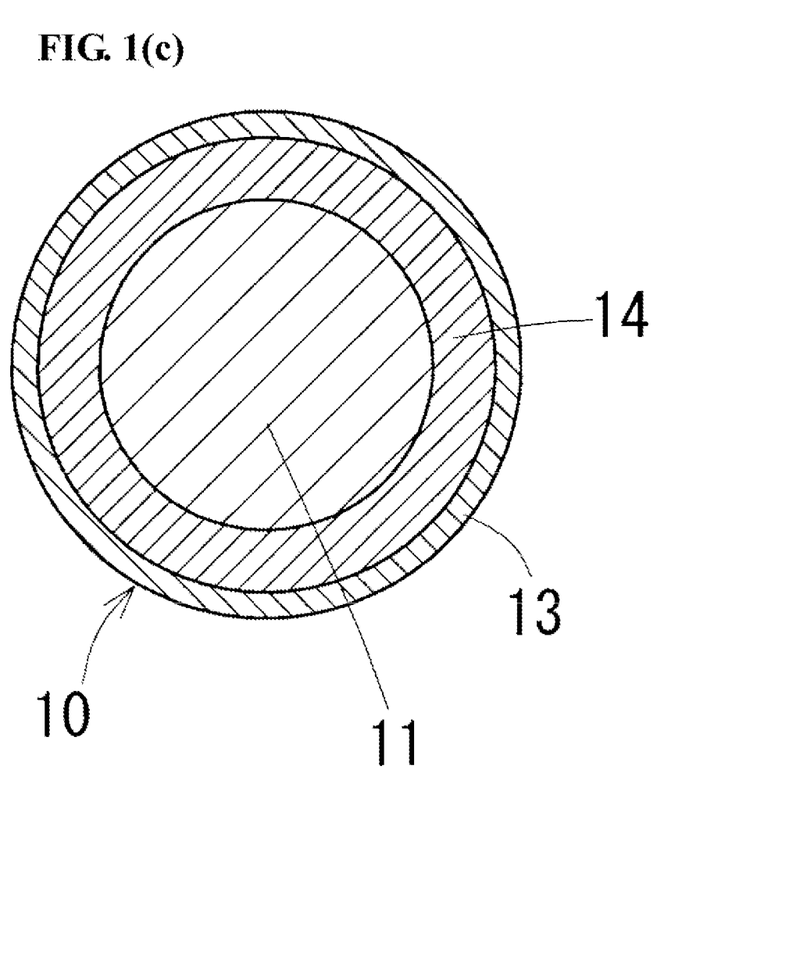
FIG. 1(c) is a cross-sectional view of an electrode wire for wire electric discharge machining according to another embodiment.
Figure 2B:
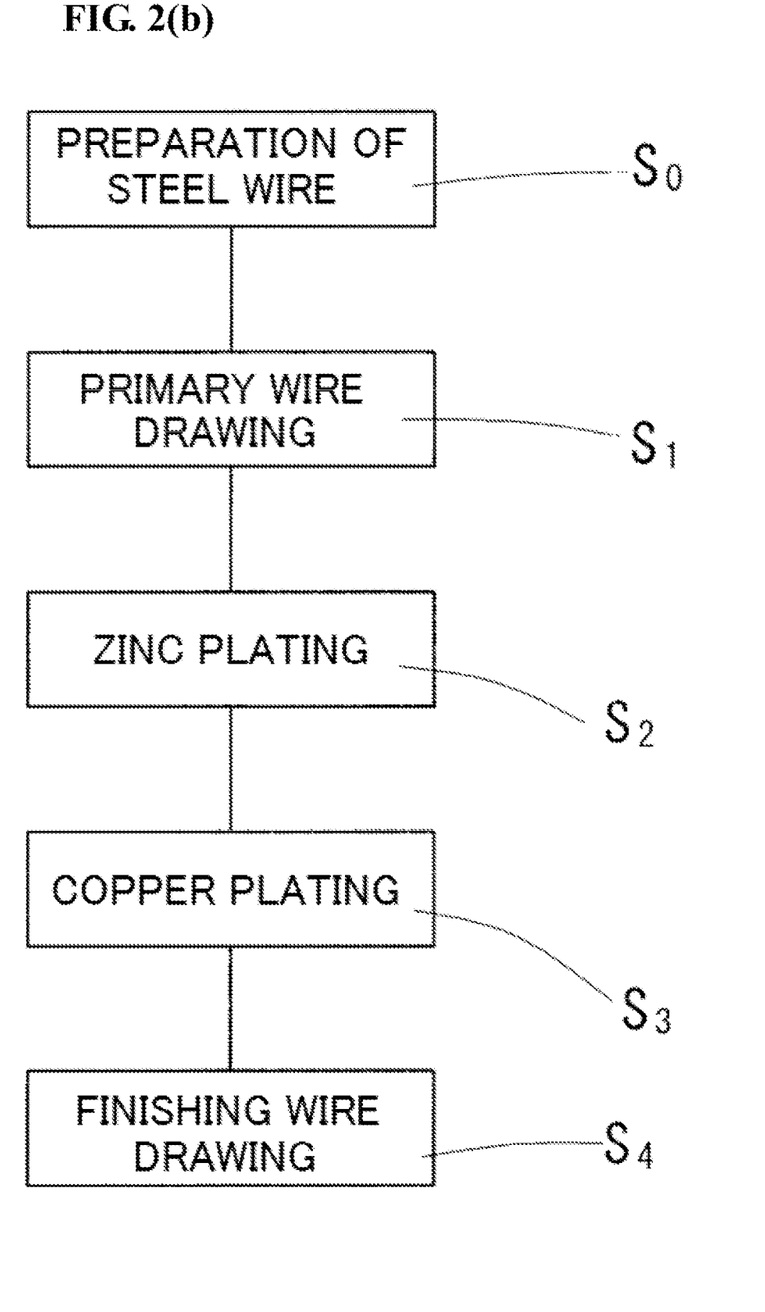
FIG. 2(b) is a flowchart showing an outline of steps of producing an electrode wire for wire electric discharge machining according to another embodiment.

A method for producing an electrode wire 10 of another embodiment will be described with reference to FIGS. 2(b) and 1(c). In this embodiment, in plating processes, a zinc plating layer 14 is first formed on the surface of a wire rod in step $S_2$, and, subsequently, a copper plating layer 13 is further formed on the zinc plating layer 14 in step $S_3$ to form a state in which the zinc plating layer 14 is formed as an inner layer of the surface of a steel wire 11 and the copper plating layer 13 is formed as an outer layer of the surface of the steel wire 11. Subsequently, a copper-zinc alloy plating layer 12 is formed by a diffusion treatment.

Figure 3:
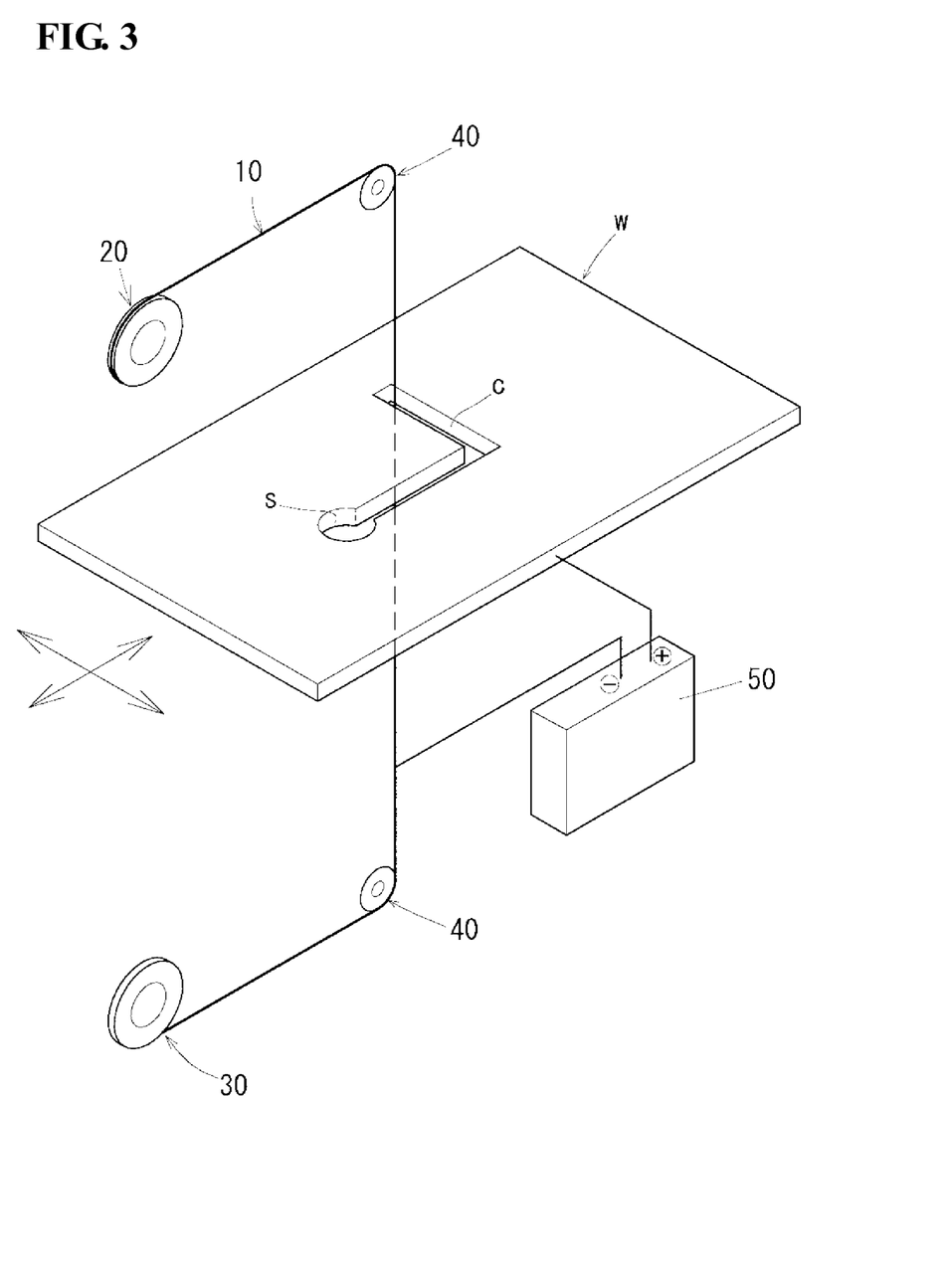
FIG. 3 is a perspective view showing an outline of a state where an electrode wire for wire electric discharge machining is used.

The electrode wire 10 of embodiments and the methods for producing the electrode wire 10 are as described above. Next, a method for using the electrode wire will be described with reference to FIG. 3. Note that FIG. 3 is a schematic view and does not accurately show dimensions and the like of components.

First, a workpiece w is placed on a table (not shown) so as to be movable on a surface. A start spot s is formed in the workpiece w, and an electrode wire 10 of an embodiment is pierced through the start spot s. A very small gap is present between the start spot s and the electrode wire 10.

An end of the electrode wire 10 is wound around a supply reel 20 through a tension roller 40. Another end of the electrode wire 10 is wound around a take-up reel 30 through a tension roller 40. The electrode wire 10 is fed from the supply reel 20 to the take-up reel 30 by the rotations of the supply reel 20 and the take-up reel 30. Tension applied to the electrode wire 10 is controlled by the pair of tension rollers 40.

In this state, a voltage is intermittently applied from a power supply 50 between the electrode wire 10 and the workpiece w. Note that the electrode wire 10 and the workpiece w are immersed in a machining fluid such as water.

Electric discharge is generated between the electrode wire 10 and the workpiece w by application of the voltage. A portion of the workpiece w located around the electrode wire starts to melt, in a non-contact state, due to heat generated by the electric discharge.

When the workpiece w is moved while the electrode wire 10 is successively fed, a cut line c due to melting is formed along the trajectory of the electrode wire on the workpiece w, thereby achieving cutting.

Since the electrode wire 10 of the embodiment has a relatively small wire diameter of 30 to 200 µm, a good machining accuracy is obtained. Since the copper-zinc alloy plating layer 12 has a high zinc concentration of 60% to 75% by mass, good discharge performance is obtained. In addition, since the copper-zinc alloy plating layer 12 has a conductivity of 10% to 20% IACS, the conductive property is not insufficient. Accordingly, the electrode wire 10 has an excellent balance between the discharge performance and the conductive property. Therefore, the electrode wire 10 of the embodiment has an improved machining speed in electric discharge machining, as compared with existing electrode wires.

EXAMPLES

The content of the present invention will be further made clear by using more detailed Examples and Comparative Examples described below.

As shown in Table I below, in accordance with the method for producing an electrode wire of the embodiment, copper plating and zinc plating were sequentially performed on an 80-carbon wire rod having a wire diameter of 0.4 mm before plating such that the total plating thickness became 33 µm. Finishing wire drawing was performed for each of the resulting plated electrode wires under the same conditions for the reduction of area etc. (reduction of area: 95.4%, number of dies: 17). Thus, electrode wires for wire electric discharge machining of Examples 1 to 3 and Comparative Examples 1 and 2, the electrode wires each having a wire diameter of 100 µm and a plating thickness of 7 µm, and having an average zinc concentration in the copper-zinc alloy plating shown in Table I, were prepared.

A machining speed of each of the electrode wires of Examples 1 to 3 and Comparative Examples 1 and 2 was evaluated at a tension of 600 MPa, a voltage of 7 V, and a ratio of current supply time:current non-supply time=1:8. The results are shown in Table I.

TABLE I

|  | Zinc concentration in plating (%) | Conductivity (% IACS) | Machining speed (mm/s) |
| --- | --- | --- | --- |
| Example 1 | 60 | 11.2 | 2.33 |
| Example 2 | 70 | 10.3 | 2.60 |
| Example 3 | 75 | 10.8 | 2.28 |
| Comparative Example 1 | 80 | 12.0 | 2.20 |
| Comparative Example 2 | 40 | 21.0 | 2.00 |

Next, die angles of the initial four dies (refer to "Die diameter" in Table II below) of the finishing wire drawing, the dies being used in the procedure described in Examples 1 to 3, were changed, and the effect of a wire-drawing condition index was examined. The results are shown in Table II. Herein, the wire-drawing condition index is defined as wire-drawing condition index=die half angle (rad.)×{1+ $\sqrt{(1-\text{reduction of area})}$}$^2$/reduction of area.

TABLE II

|  | Die diameter (mm) | Reduction of area | Die half angle degree | Wire-drawing condition index | Result of wire drawing |
| --- | --- | --- | --- | --- | --- |
| Example 4 | 0.411 | 20% | 5.5 | 1.71 |  |
|  | 0.367 | 20% | 5.5 | 1.70 |  |
|  | 0.328 | 20% | 5.5 | 1.71 |  |
|  | 0.293 | 20% | 5.5 | 1.70 | Wire drawing was completed up to 70 µm. |
| Comparative Example 3 | 0.411 | 20% | 6.5 | 2.02 | Peeling of plating |
|  | 0.367 | 20% | 5.5 | 1.70 |  |
|  | 0.328 | 20% | 5.5 | 1.71 |  |
|  | 0.293 | 20% | 5.5 | 1.70 |  |
| Comparative Example 4 | 0.411 | 20% | 3.5 | 1.09 | Separation of plating |
|  | 0.367 | 20% | 5.5 | 1.70 |  |
|  | 0.328 | 20% | 5.5 | 1.71 |  |
|  | 0.293 | 20% | 5.5 | 1.70 |  |
| Comparative Example 5 | 0.411 | 20% | 5.5 | 1.71 |  |
|  | 0.367 | 20% | 6.5 | 2.01 | Peeling of plating |
|  | 0.328 | 20% | 5.5 | 1.71 |  |
|  | 0.293 | 20% | 5.5 | 1.70 |  |

TABLE II-continued

| | Die diameter (mm) | Reduction of area | Die half angle degree | Wire-drawing condition index | Result of wire drawing |
|---|---|---|---|---|---|
| Comparative Example 6 | 0.411 | 20% | 5.5 | 1.71 | |
| | 0.367 | 20% | 3.5 | 1.08 | Glossy plating |
| | 0.328 | 20% | 5.5 | 1.71 | Separation of plating |
| | 0.293 | 20% | 5.5 | 1.70 | |
| Comparative Example 7 | 0.411 | 20% | 5.5 | 1.71 | |
| | 0.367 | 20% | 5.5 | 1.70 | |
| | 0.328 | 20% | 6.5 | 2.02 | Peeling of plating |
| | 0.293 | 20% | 5.5 | 1.70 | |
| Comparative Example 8 | 0.411 | 20% | 5.5 | 1.71 | |
| | 0.367 | 20% | 5.5 | 1.70 | |
| | 0.328 | 20% | 3.5 | 1.09 | Peeling of plating |
| | 0.293 | 20% | 5.5 | 1.70 | |

Referring to Table II, in the cases where the die half angle is changed and the wire-drawing condition index is outside the range of 1.2 to 2.0, problems such as separation and peeling may occur in plating. It is also confirmed that, in such a case, alternatively, glossiness is generated in plating, and separation or peeling may occur in the subsequent wire drawing die.

Next, in the same wire drawing, the reduction of area was changed by controlling the die diameter. The results of wire drawing in this case are shown in the table below.

TABLE III

| | Die diameter (mm) | Reduction of area | Die half angle degree | Wire-drawing condition index | Result of wire drawing |
|---|---|---|---|---|---|
| Example 4 | 0.411 | 20% | 5.5 | 1.71 | |
| | 0.367 | 20% | 5.5 | 1.70 | |
| | 0.328 | 20% | 5.5 | 1.71 | |
| | 0.293 | 20% | 5.5 | 1.70 | Wire drawing was completed up to 70 μm. |
| Comparative Example 9 | 0.389 | 28% | 5.5 | 1.15 | Glossy plating |
| | 0.353 | 18% | 5.5 | 1.98 | Peeling of plating |
| | 0.322 | 17% | 5.5 | 2.09 | |
| | 0.293 | 17% | 5.5 | 2.04 | |
| Comparative Example 10 | 0.419 | 17% | 5.5 | 2.06 | Separation of plating |
| | 0.367 | 23% | 5.5 | 1.45 | |
| | 0.328 | 20% | 5.5 | 1.71 | |
| | 0.293 | 20% | 5.5 | 1.70 | |
| Comparative Example 11 | 0.411 | 20% | 5.5 | 1.71 | |
| | 0.348 | 28% | 5.5 | 1.16 | Separation of plating |
| | 0.310 | 21% | 5.5 | 1.66 | |
| | 0.293 | 11% | 5.5 | 3.40 | |
| Comparative Example 12 | 0.411 | 20% | 5.5 | 1.71 | |
| | 0.375 | 17% | 5.5 | 2.10 | Separation of plating |
| | 0.328 | 23% | 5.5 | 1.44 | |
| | 0.293 | 20% | 5.5 | 1.70 | |
| Comparative Example 13 | 0.411 | 20% | 5.5 | 1.71 | |
| | 0.367 | 20% | 5.5 | 1.70 | |
| | 0.335 | 17% | 5.5 | 2.11 | Glossy plating |
| | 0.293 | 24% | 5.5 | 1.44 | Separation of plating |
| Comparative Example 14 | 0.411 | 20% | 5.5 | 1.71 | |
| | 0.367 | 20% | 5.5 | 1.70 | |
| | 0.312 | 28% | 5.5 | 1.19 | Peeling of plating |
| | 0.293 | 12% | 5.5 | 3.06 | |

Referring to Table III, it was confirmed that, also in the cases where the wire-drawing condition index is outside the range of 1.2 to 2.0 as a result of an increase or a decrease in the reduction of area, the same problems in plating may occur.

It is to be considered that the embodiments and Examples disclosed herein are only illustrative and are not restrictive in all respects. The scope of the present invention is defined by the claims described below. It is intended that the scope of the present invention includes equivalents of the claims and all corrections and modifications within the scope of the claims.

REFERENCE SIGNS LIST 10 electrode wire for wire electric discharge machining of embodiment
11 steel wire
12 copper-zinc alloy plating layer
13 copper plating layer
14 zinc plating layer
20 supply reel
30 take-up reel
40 tension roller
50 power supply
w product to be machined (workpiece)
s start spot
c cut line

The invention claimed is:

1. An electrode wire for wire electric discharge machining, the electrode wire comprising:
    a steel wire serving as a core wire; and
    a plating layer that covers the steel wire and that is composed of a copper-zinc alloy,
    wherein an average zinc concentration of the plating layer is 60% to 75% by mass,
    a conductivity of the plating layer is 10% to 20% of 0.15328 ohm (meter, gram) at 20° C.,
    a wire diameter is 30 to 200 μm, and
    the plating layer covers the entire circumference of the cross section perpendicular to the longitudinal direction of the steel wire.

2. The electrode wire for wire electric discharge machining according to claim 1, wherein a tensile strength is 2,000 MPa or more.

3. A method for producing the electrode wire for wire electric discharge machining according to claim 1, wherein a wire-drawing condition index equals a value x that meets the following equation: $1.2 \leq x \leq 2.0$.

* * * * *